United States Patent
Peterson et al.

(10) Patent No.: US 9,773,457 B2
(45) Date of Patent: Sep. 26, 2017

(54) TRANSMISSIVE LCD DISPLAY ILLUMINATION WITH DEPOSITED LIGHT-GENERATING SOURCES

(71) Applicant: Rohinni, LLC, Coeur d'Alene, ID (US)

(72) Inventors: Cody G. Peterson, Hayden, ID (US); Andrew P. Huska, Liberty Lake, WA (US); Kasey C. Christie, Austin, TX (US)

(73) Assignee: Rohinni, LLC, Couer d'Alene, ID (US)

( * ) Notice: Subject to any disclaimer, the term of this patent is extended or adjusted under 35 U.S.C. 154(b) by 0 days.

(21) Appl. No.: 14/541,102

(22) Filed: Nov. 13, 2014

(65) Prior Publication Data

US 2015/0205155 A1   Jul. 23, 2015

Related U.S. Application Data

(60) Provisional application No. 61/903,397, filed on Nov. 13, 2013.

(51) Int. Cl.
| | |
|---|---|
| *G09G 5/10* | (2006.01) |
| *G09G 3/34* | (2006.01) |
| *G02F 1/1335* | (2006.01) |
| *G09G 3/36* | (2006.01) |

(52) U.S. Cl.
CPC ..... *G09G 3/3406* (2013.01); *G02F 1/133603* (2013.01); *G09G 3/3426* (2013.01); *G09G 3/36* (2013.01); *G02F 2001/133601* (2013.01); *G09G 2320/0238* (2013.01); *G09G 2320/0646* (2013.01)

(58) Field of Classification Search
CPC ............. G09G 3/3406; G09G 3/36; G09G 2320/0238; G02F 1/133603; G02F 2001/133601
See application file for complete search history.

(56) References Cited

U.S. PATENT DOCUMENTS

| | | | | |
|---|---|---|---|---|
| 7,126,567 | B2 * | 10/2006 | Nishikawa | B60K 35/00 345/102 |
| 7,498,739 | B1 * | 3/2009 | Steffensmeier | G02F 1/13362 313/504 |
| 8,054,415 | B2 | 11/2011 | Fratti et al. | |
| 8,104,945 | B2 | 1/2012 | Kim et al. | |
| 8,415,879 | B2 | 4/2013 | Lowenthal et al. | |
| 9,159,707 | B2 | 10/2015 | Cope | |
| 2004/0027041 | A1 * | 2/2004 | Nishikawa | B60K 35/00 313/110 |
| 2010/0014027 | A1 | 1/2010 | Li et al. | |
| 2012/0146066 | A1 * | 6/2012 | Tischler | H01L 27/156 257/89 |
| 2012/0161113 | A1 * | 6/2012 | Lowenthal | H01L 25/048 257/40 |

(Continued)

OTHER PUBLICATIONS

"Competitive Display Technologies White Paper", Mirasol, Jun. 2009, 20 pages.

*Primary Examiner* — Peter D McLoone
(74) *Attorney, Agent, or Firm* — Lee & Hayes, PLLC

(57) ABSTRACT

Disclosed herein are technologies related to the use of deposited light-generating sources as the backlight for transmissive illumination of the pixel structures of a transmissive display. This Abstract is submitted with the understanding that it will not be used to interpret or limit the scope or meaning of the claims.

18 Claims, 4 Drawing Sheets

(56) References Cited

U.S. PATENT DOCUMENTS

| | | | |
|---|---|---|---|
| 2013/0248889 A1* | 9/2013 | Lin | H01L 25/0753 257/88 |
| 2013/0271959 A1* | 10/2013 | Woodgate | F21K 9/00 362/97.1 |
| 2014/0192078 A1* | 7/2014 | Gilbert | G09G 3/3406 345/590 |
| 2014/0226110 A1* | 8/2014 | Doyle | G02F 1/133603 349/69 |
| 2014/0276248 A1* | 9/2014 | Hall | A61N 1/0432 601/2 |
| 2017/0062400 A1 | 3/2017 | Li et al. | |

* cited by examiner

TRANSMISSIVE LCD DISPLAY ILLUMINATION WITH DEPOSITED LIGHT-GENERATING SOURCES

PRIORITY CLAIM AND CROSS-REFERENCE TO RELATED APPLICATIONS

This application claims the benefit under 35 U.S.C. §119 (e)(1) of U.S. Provisional Application No. 61/897,824, filed Oct. 31, 2013; and No. 61/903,397, filed Nov. 13, 2013, which are hereby incorporated by reference in their entirety.

BACKGROUND

To create a liquid crystal display (LCD), one starts with two pieces of polarized glass. On the side of the glass that does not have the polarizing film on it there is a special polymer that creates microscopic grooves in the surface. The grooves are in the same direction as the polarizing film. On one of the filters, a coating of nematic liquid crystals is added. The grooves will cause the first layer of molecules to align with the filter's orientation. Then the second piece of glass with the polarizing film is added at a right angle to the first piece. Each successive layer of twisted nematic (TN) molecules will gradually twist until the uppermost layer is at a right angle to the bottom, matching the polarized glass filters.

As light strikes the first filter, it is polarized. The molecules in each layer then guide the light they receive to the next layer. As the light passes through the liquid crystal layers, the molecules also change the light's plane of vibration to match their own angle. When the light reaches the far side of the liquid crystal substance, it vibrates at the same angle as the final layer of molecules. If the final layer is matched up with the second polarized glass filter, then the light will pass through.

If an electric charge is applied to liquid crystal molecules, the molecules untwist. When they straighten out, they change the angle of the light passing through them so that it no longer matches the angle of the top polarizing filter. Consequently, no light can pass through that area of the LCD, which makes that area darker than the surrounding areas.

A basic LCD is constructed in layers. It has a mirror in back, which makes it reflective. Then, next is added a piece of glass with a polarizing film on the bottom side and a common electrode plane made of indium-tin oxide on top. A common electrode plane covers the entire area of the LCD. Above that is the layer of liquid crystal substance. Next comes another piece of glass with an electrode in the shape of the rectangle on the bottom and, on top, another polarizing film, at a right angle to the first one.

The electrode is hooked up to a power source like a battery. When there is no current, light entering through the front of the LCD will simply hit the mirror and bounce right back out. But when the battery supplies current to the electrodes, the liquid crystals between the common-plane electrode and the electrode shaped like a rectangle untwist and block the light in that region from passing through. That makes the LCD show the rectangle as a black area.

An LCD that can show colors typically have three sub-pixels with red, green and blue color filters to create each color pixel. Through the careful control and variation of the voltage applied, the intensity of each subpixel can range over multiple shades (e.g., 256 shades). Combining the subpixels produces a possible palette of many more (e.g., 16.8 million colors (256 shades of red×256 shades of green×256 shades of blue)).

LCD technology is constantly evolving. LCDs today employ several variations of liquid crystal technology, including super twisted nematics (STN), dual scan twisted nematics (DSTN), ferroelectric liquid crystal (FLC) and surface stabilized ferroelectric liquid crystal (SSFLC).

Along the edge of a typical LCD display or television is a cold cathode fluorescent (CCFL) or an array of light-emitting diodes (LEDs). Using the optical system, these lights backlight the pixels of the display. Indeed, these lights are typically the only lights in the display.

The optical system includes a first sheet that makes a nice even white background for the light. The next piece is called a "light-guide plate" (LGP). When light enters from the edge of the LGP, it propagates through the plate by total internal reflection, unless it hits one of many dots. The dots make some of the light rays emerge out the front. Then engineers place a diffuser film; it helps eliminate the dot pattern from the light-guide plate. Then comes a "prism film."

This is used because light from the backlight emerges not only perpendicular to the back surface, but also at oblique angles. This sheet will increases the perpendicular part a bit: Another diffuser film is added to form an evenly lit surface.

In a typical LCD display, the "backlight" is always on when the device is on, but what controls what is seen is a piece of glass: It functions as a shutter. At the back and front of this glass sheet are two polarizers. They stick tightly to the piece of glass.

The glass has two panes separated by tiny glass beads to keep them separated and with organic molecules known as liquid crystals. These crystals have interesting properties in that they do not allow light to pass uniformly along both axes. Grooves are formed on the surface of both pieces of glass at 90 degrees to one another. The molecules in-between line up in a beautiful helix.

When light from the backlight passes through the first polarizer and enters the sandwich, it's rotated by the liquid crystals so as to allow it to pass through the second polarizer and emerge out the front of the screen. This is known as the normally white mode. Applying an electric field across the sandwich causes the crystals to line up lengthwise.

Now the light that passes through the first polarizer is not rotated by the crystals and can no longer pass through the front of the screen. This is the normally black mode.

By controlling the voltage between these transparent electrodes, the intensity of the light that passes through can be controlled. Each pixel includes red, green, and blue sections. These are sub-pixels: The three together make a single pixel.

In the sandwich these are simply colored tiles that overlay the front transparent electrodes. They follows the RGB color model: The "electrode-shutter" behind the sub-pixels is adjusted so that they make up a particular color. For example, to get the color of the blue in my shirt we set the red sub-pixel to 12% of maximum intensity, green to 21% and blue to about 50%.

On the back pane engineers paint tiny devices called thin film transistors (TFT). Each sub-pixel has transistor which controls it. This transistor functions as a switch that allows the screen to be updated row by row.

By applying a voltage to a specific row while keeping the other rows grounded we allow each sub-pixel in that row to receive video data coming from the top of the screen. Only

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
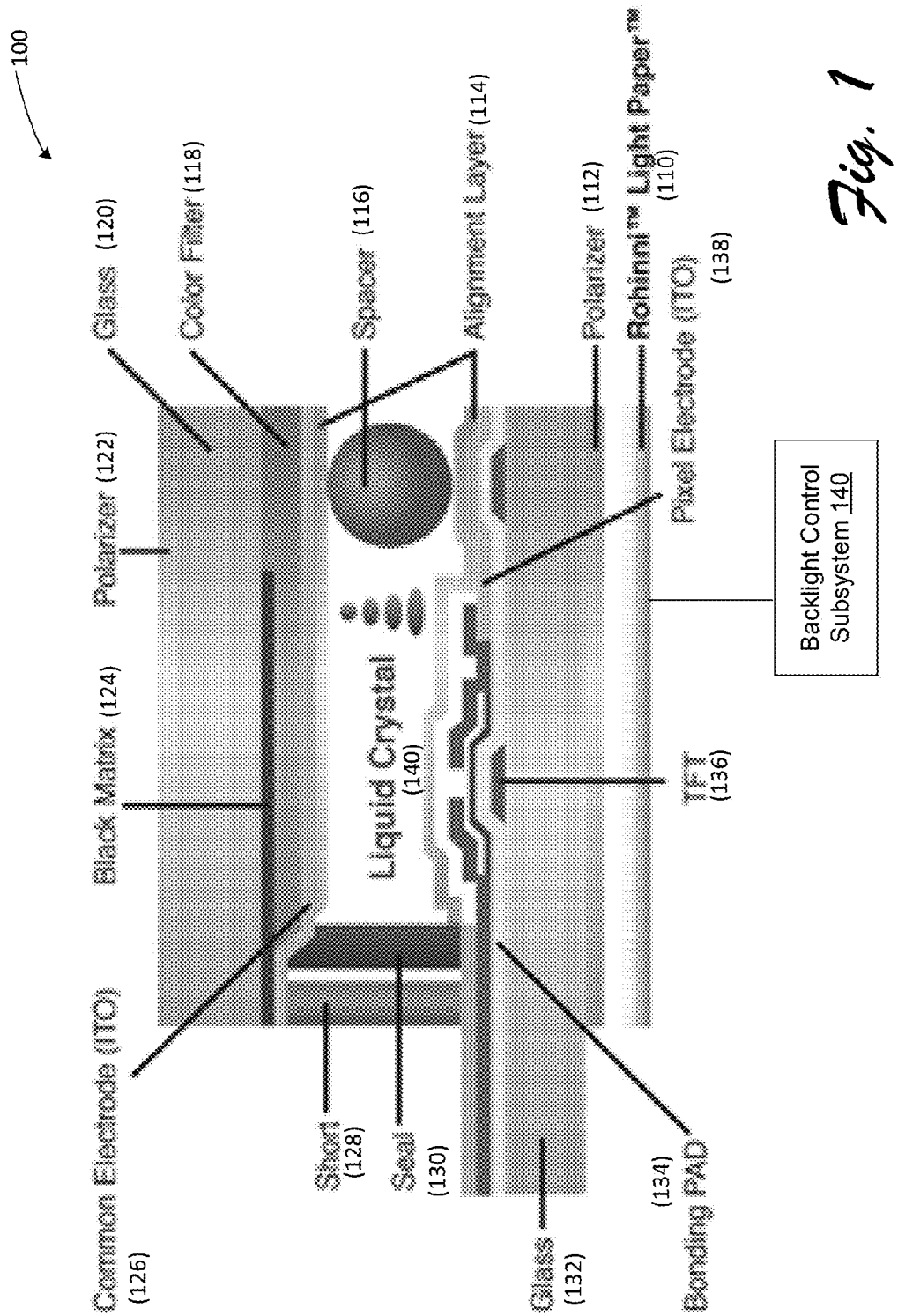
FIG. 1 shows an example system in accordance with one or more implementations described herein.

Disclosed herein are technologies related to the use of deposited light-generating sources as the backlight for transmissive illumination of the pixel structures of a transmissive display.

Transmissive Displays

Transmissive displays (e.g., LCD displays) work by modulating a source of light using an optically active material, such as a liquid-crystal mixture. With the extensive use of optical films, such as polarizers and color filters, with LCD displays, as well as the thin film transistor element which itself requires several process steps to fabricate. Since LCDs work with polarized light, the necessity of using a polarizer limits the amount of light that is reflected or transmitted from the display—at least 50% of light is discarded by the polarizer.

The additional layers, such as the color filter, reduce light even further—a typical LCD will only transmit six percent of the light it has the potential to use. Consequently, today's LCDs require brighter backlights in order to be readable, whether in total darkness or in the bright sunlight. These brighter backlights lead to greater power consumption.

Currently, backlighting for LCDs is the single biggest power draw in portable displays (e.g., mobile phone). This is especially true in bright environments where the backlight has to be switched to the brightest mode With one of the new approaches described herein, a substrate having a matrix of deposited light-generating sources is attached (e.g., laminated) to a surface behind the back polarizing layer of the LCD pixel structures. That surface can be the polarizing layer itself (e.g., glass or like material) or it can be a presumably flat surface behind the polarizing layer.

With some implementations, the substrate with the deposited light-generating sources may be superthin (e.g., 0.1 to 0.15 mm thick). This arrangement allows for the overall display to be substantially thinner than traditional LCD displays.

It is thinner than a conventional directly and rear lit LED LCD display because the thickness of the infrastructure of a panel of conventional LEDs for backlighting is eliminated/reduced to the superthin nature of the substrate with the deposited pLEDs.

Also, it is thinner than a conventional edge-lit LCD display because the propose superthin substrate is much thinner than a conventional light plate used to backlight the display. A conventional light plate is about 0.25-0.5 mm thick.

Transmissive Illumination of Display Using Deposited Light-Generating Sources—with Full Array Having a Pixel Granularity With conventional approaches, the conventional light plate (light-plate guide (LPB)) is very difficult to impossible to effectively address. Consequently, addressable regions of light plates have a size that greatly exceeds the size of a display's LCD pixel structure.

Also, the conventional LEDs that typically backlight a LCD are large and have addressable regions that are greater in physical size than that of the size of the display's LCD pixel structure.

The one or more of the new approaches described herein utilize deposited light-generating sources (e.g., pLEDs) to for transmissive illumination of the LCD pixel structures of a LCD display.

With one more of the new approaches, a substrate of a matrix of deposited light-generating sources is laminated to a surface behind the back polarizing layer of the LCD pixel structures. That surface can be the polarizing layer itself (e.g., glass or like material) or it can be a presumably flat surface behind the polarizing layer.

With some implementations, the substrate with the deposited light-generating sources may be superthin (e.g., 0.1 to 0.15 mm thick). This arrangement allows for the overall display to be substantially thinner than traditional LCD displays.

It is thinner than a conventional directly and rear lit LED LCD display because the thickness of the infrastructure of a panel of conventional LEDs for backlighting is eliminated/reduced to the superthin nature of the substrate with the deposited pLEDs.

Also, it is thinner than a conventional edge-lit LCD display because the propose superthin substrate is much thinner than a conventional light plate used to backlight the display. A conventional light plate is about 0.25-0.5 mm thick.

In addition, there is single addressable area of one or more light-generating sources behind each pixel of the LCD display. In this way, each pixel can be individually turned on or off.

FIG. 1 illustrates an example LCD pixel structure 100 in accordance with the example implementation described herein. As depicted, the backlight light source 110 for the LCD pixel structure 100 is located directly behind and separate from the LCD pixel structure. That backlight light source may also be called "Rohinni™ LightPaper™ in the drawing figure. In this example implementation, it is a lighted substrate having light-generating sources (e.g., printed LEDs) deposited (e.g., printed) directly thereon the substrate.

The LCD pixel structure 100 includes two panes of glass (120 and 132) with each having their own polarizer (e.g., polarizing film) thereon (122 and 112). Sandwiched inbetween the glass is the liquid crystal 140 itself along with a spacer 116. Also, included are other components for the construction and electrical operation of the LCD pixel structure 100. Those include alignment layer 114, color filter 118, black matrix 124, common electrode 126, short 128, seal 130, bonding pad 134, TFT 136, and pixel electrode 138. The backlight control subsystem 140 controls and addressed the backlight of each pixel independently of the others.

In this example implementation, a matrix of lighting regions of light-generating sources deposited on the substrate so that when the substrate is positioned behind the LCD display that each region is located directly behind each pixel. As shown in the above figure, the lighting region for the shown LCD pixel structure has a size approximately matching that of the pixel. In other implementations, a lighting region may have a size smaller than the pixel size.

Figure 2:
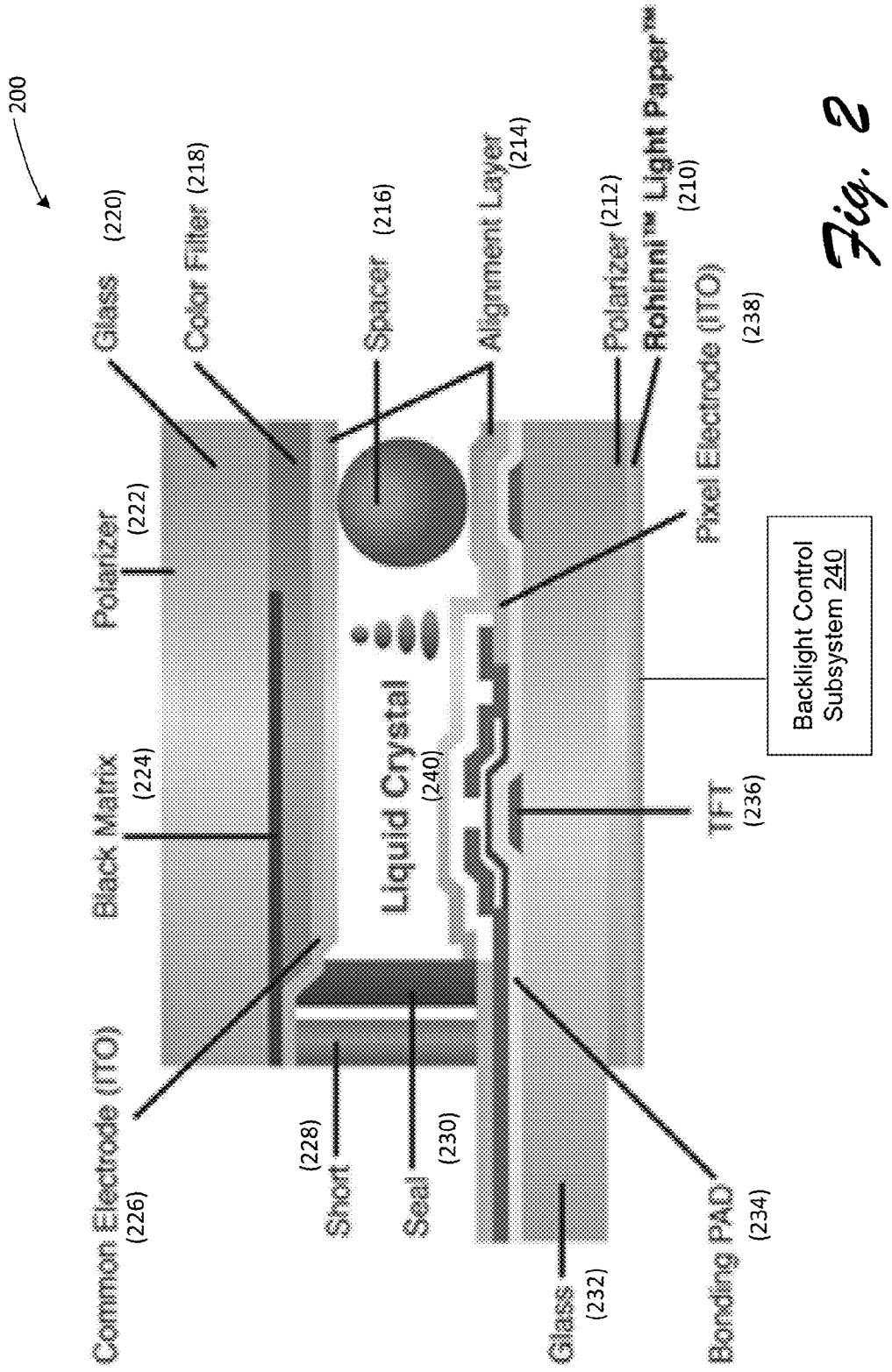
FIG. 2 shows an example system in accordance with one or more implementations described herein.

FIG. 2 illustrates another example LCD pixel structure 200 in accordance with the example implementation described herein. As depicted, the backlight light source 210 for the LCD pixel structure 200 is located directly behind, but unlike the previously described example, the backlight light source 210 is not separate from the LCD pixel structure. Unlike the previously described and shown examples, the backlight substrate is affixed to the back of the LCD pixel structure (e.g., the polarizer layer). There is no air gap between the back of the LCD pixel structure and the lighted substrate.

The backlight light source may also be called "Rohinni™ LightPaper™" in the drawing figure. In this example implementation, it is a lighted substrate having light-generating sources (e.g., printed LEDs) deposited (e.g., printed) directly thereon the substrate.

The LCD pixel structure 200 includes two panes of glass (220 and 232) with each having their own polarizer (e.g., polarizing film) thereon (222 and 212). Sandwiched in-between the glass is the liquid crystal 240 itself along with a spacer 216. Also, included are other components for the construction and electrical operation of the LCD pixel structure 200. Those include alignment layer 214, color filter 218, black matrix 224, common electrode 226, short 228, seal 230, bonding pad 234, TFT 236, and pixel electrode 238. The backlight control subsystem 240 controls and addressed the backlight of each pixel independently of the others.

In this example implementation, a matrix of lighting regions of light-generating sources deposited on the substrate so that when the substrate is positioned behind the LCD display that each region is located directly behind each pixel. As shown in the above figure, the lighting region for the shown LCD pixel structure has a size approximately matching that of the pixel. In other implementations, a lighting region may have a size smaller than the pixel size.

The backlight substrate may be affixed to the back of the LCD pixel structure in any suitable manner, such as adhesion using glue or themo-adhesion.

Figure 3:
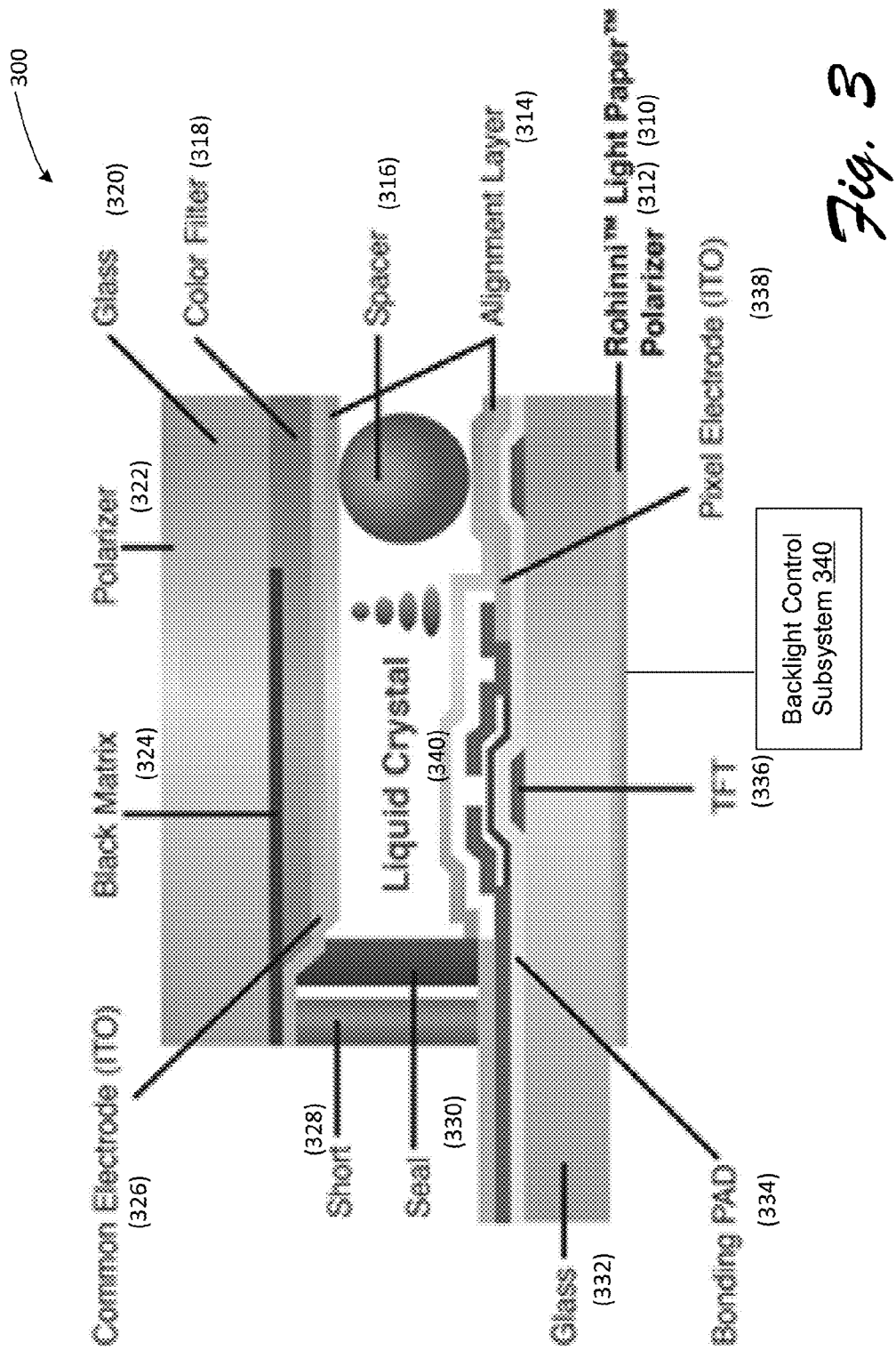
FIG. 3 shows an example system in accordance with one or more implementations described herein.

FIG. 3 illustrates another example LCD pixel structure 300 in accordance with the example implementation described herein. As depicted, the backlight light source 310 for the LCD pixel structure 300 is located directly behind, but unlike the previously described example, the backlight light source 310 is not separate from the LCD pixel structure. Unlike the previously described and shown examples, the backlight substrate is part of the back layer of the LCD pixel structure (e.g., the polarizer layer 312). In this example, the polarizing layer 312 is (at least in part) a translucent substrate on which the light-generating sources are deposited thereon so as to shine thru the substrate and backlight the LCD pixel structure.

The backlight light source may also be called "Rohinni™ LightPaper™" in the drawing figure. In this example implementation, it is a lighted substrate having light-generating sources (e.g., printed LEDs) deposited (e.g., printed) directly thereon the substrate.

The LCD pixel structure 300 includes two panes of glass (320 and 332) with each having their own polarizer (e.g., polarizing film) thereon (322 and 312). Sandwiched inbetween the glass is the liquid crystal 340 itself along with a spacer 316. Also, included are other components for the construction and electrical operation of the LCD pixel structure 300. Those include alignment layer 314, color filter 318, black matrix 324, common electrode 326, short 328, seal 330, bonding pad 334, TFT 336, and pixel electrode 338. The backlight control subsystem 340 controls and addressed the backlight of each pixel independently of the others.

In this example implementation, a matrix of lighting regions of light-generating sources deposited on the substrate so that when the substrate is positioned behind the LCD display that each region is located directly behind each pixel. As shown in the above figure, the lighting region for the shown LCD pixel structure has a size approximately matching that of the pixel. In other implementations, a lighting region may have a size smaller than the pixel size.

In this example, the lighting regions will be printed on one side of the substrate in a manner so as the light would be directed to shine thru the translucent polarizing substrate.

For one or more of the implementations discussed above and depicted in FIGS. 1-3, the following description might also be used.

There is liquid crystal display (LCD) system that includes an array of LCD pixel structures (e.g., structures 100, 200, and 300), wherein each LCD pixel structure is associated with a particular pixel of the screen, the LCD pixel structure having a liquid-crystal shutter (e.g., liquid crystal 140, 240, and 340) sandwiched between a rear polarized panel (e.g., glass 132, 232, 332 and polarizer 112, 212, 312) and a front polarized panel (e.g., glass 120, 220, 320 and polarizer 122, 222, 322) and electronics controls (e.g., various electrodes, transistors (e.g, TFT), and circuitry) configured to operate on the liquid-crystal shutter to modulate light passing through the LCD pixel structure.

The LCD system also includes a matrix of pixel backlights (e.g., 110, 210, and 310), wherein each pixel backlight is associated with its own individual pixel of the screen and positioned behind the LCD pixel structure associated with its associated individual pixel in a manner to provide transmissively illuminate therethrough, each pixel backlight being independently addressable from the other pixel backlights of the matrix.

The LCD system also includes a backlight control subsystem (e.g, 140, 240 and 340) configured to modulate intensity of light generated by each pixel backlight of the matrix.

The LCD pixel structure may include three or more different colored subpixel structures. For example, RGB (red, green, and blue) to produce all colors from a given pixel. Indeed, there may be individually addressable pixel backlight for each subpixel structure.

The backlight control subsystem maybe further configured to turn off light generated by a pixel backlight associated with a black LCD pixel structure. The backlight control subsystem maybe configured to turn off light generated by a pixel backlight associated with a shuttered LCD pixel structure.

The backlight control subsystem maybe configured to turn off light generated by a pixel backlight associated with a LCD pixel structure with a liquid-crystal shutter that is closed down.

The backlight control subsystem maybe configured to turn off light generated by a particular pixel backlight while generating light by other pixel backlights that are physically adjacent thereto.

The backlight control subsystem maybe configured to turn off light generated by a particular pixel backlight while generating light by other pixel backlights that are physically adjacent thereto.

Each pixel backlight may be attached behind and separate from its associated LCD pixel structure so as to provide transmissive illuminate therethrough its rear polarized panel.

Each pixel backlight may be attached to the rear polarized panel of its associated LCD pixel structure so as to provide transmissive illuminate therethrough.

Each pixel backlight may be integrated as part of the rear polarized panel of its associated LCD pixel structure so as to provide transmissive illuminate therethrough.

Each pixel backlight may be integrated as part of the rear polarized panel of its associated LCD pixel structure so as to provide transmissive illuminate therethrough.

Each pixel backlight may be include a plurality of light-generating sources. Each pixel backlight may be include a plurality of light-generating sources, wherein each light-generating source is a light-emitting semiconductor. Each pixel backlight may be include a plurality of light-generating sources that each has a cross-section with a maximum length of 3 to 50 microns. Each pixel backlight may be include a plurality of light-generating sources, each light-generating source being deposited on a mounting surface.

Transmissive Illumination of Display Using Deposited Light-Generating Sources—Local Dimming Local dimming refers to the technology that changes the uniformity of the backlight of a LCD screen. A television can change the luminosity of parts of the screen to better reflect the scene and create deeper blacks where necessary. It improves the weak black level of a LCD screen, compared to the perfect blacks of a plasma screen.

In theory, local dimming is great. It increases the perceived contrast of the picture by lighting more the correct part of the screen and by turning off completely a dark section. In practice however, conventional LCD screens cannot control precisely the backlight, due to the lack a really independent granular backlight. The local dimming is not 100% precise and the size of the controllable zones varies between models. The worst case would be if one is watching a scene in space with stars. Overall, the scene is dark but the small stars are bright. Backlighting that is on affects a rather large area so it cannot only light up the backlight for the pixels of the stars. Depending on the implementation, it could produce a worst image than before and could create a halo effect around the stars.

Thus, with conventional "local dimming," there is a halo effect round the items on an otherwise darkened screen. This halo effect is a result of the large granularity of the addressablity of the conventional backlighting. That is, there are light sources required to light specific unshuttered pixels are bigger than the unshuttered pixels themselves. Thus, the "shuttered" pixels surrounding the lit pixels seem to be a lit to some degree.

Using deposited light-generating sources (e.g., pLEDs) for transmissive illumination of the LCD pixel structures of a LCD display.

With this approach, a substrate of a matrix of deposited light-generating sources is affixed (or laminated) to a surface behind the back polarizing layer of the LCD pixel structures (as discussed above). That surface can be the polarizing layer itself (e.g., glass or like material) or it can be a presumably flat surface behind the polarizing layer.

With this implementation, each LCD pixel structure has one or more deposited light-generating sources, which is called a pixel backlight herein. Each pixel backlight is individually addressable. That is, each pixel backlight maybe turned on or off selectively.

With some implementations, the substrate with the deposited light-generating sources may be superthin (e.g., 0.1 to 0.15 mm thick). This arrangement allows for the overall display to be substantially thinner than traditional LCD displays.

It is thinner than a conventional directly and rear lit LED LCD display because the thickness of the infrastructure of a panel of conventional LEDs for backlighting is eliminated/reduced to the superthin nature of the substrate with the deposited pLEDs.

Also, it is thinner than a conventional edge-lit LCD display because the proposed superthin substrate is much thinner than a conventional light plate used to backlight the display. A conventional light plate is about 0.25-0.5 mm thick.

In addition, there is single addressable area (e.g., pixel backlight) of one or more light-generating sources behind each pixel of the LCD display. In this way, each pixel can be individually turned on or off. When a pixel is dark, the LCD display shutters that pixel.

But with this technology, only the pixel-backlight directly associated (e.g., behind) with an unshuttered pixel is lit. Conversely, the pixel-sized areas (or smaller) of light-generating sources directly associated (e.g., behind) with a shuttered pixel is unlit. Since the granularity of the lighting and the pixels match (or is even higher), there is no halo effect with local dimming.

Transmissive Illumination of Display Using Deposited Light-Generating Sources—Local Dimming with Video Signal Synching With conventional local dimming, there may be a processing lag to produce the local dimming effect. This is a result, at least in part, because of the calculation required to map the matrix of light sources with the matrix of pixel.

Using deposited light-generating sources (e.g., pLEDs) for transmissive illumination of the LCD pixel structures of a LCD display.

With this approach, a substrate of a matrix of deposited light-generating sources is affixed (e.g., laminated) to a surface behind the back polarizing layer of the LCD pixel structures. That surface can be the polarizing layer itself (e.g., glass or like material) or it can be a presumably flat surface behind the polarizing layer.

With some implementations, the substrate with the deposited light-generating sources may be superthin (e.g., 0.1 to 0.15 mm thick). This arrangement allows for the overall display to be substantially thinner than traditional LCD displays.

It is thinner than a conventional directly and rear lit LED LCD display because the thickness of the infrastructure of a panel of conventional LEDs for backlighting is eliminated/reduced to the superthin nature of the substrate with the deposited pLEDs.

Also, it is thinner than a conventional edge-lit LCD display because the proposed superthin substrate is much thinner than a conventional light plate used to backlight the display. A conventional light plate is about 0.25-0.5 mm thick.

In addition, there is single addressable area (e.g., pixel backlight) of one or more light-generating sources behind each pixel of the LCD display. In this way, each pixel can be individually turned on or off. When a pixel is dark, the LCD display shutters that pixel.

But with this technology, only the pixel-backlight directly associated (e.g., behind) with an unshuttered pixel is lit.

Conversely, the pixel-sized areas (or smaller) of light-generating sources directly associated (e.g., behind) with a shuttered pixel is unlit. Since the granularity of the lighting and the pixels match (or is even higher), there is no halo effect with local dimming.

With the matrix of addressable light sources matching the matrix of pixels of the display, the signals from the graphics processor that drives the lighting of the pixels may be used to also drive the matrix of addressable light sources. Thus, they pixel backlighting is synchronized with its corresponding pixel shuttering. Since the matrix match, there is little or no calculations required to drive the matrix of addressable light sources.

The above-discussed methods of local dimming may be described in this manner.

A process facilitating local dimming and that process includes:

Obtaining a video signal to generate an image on a liquid-crystal display (LCD) screen. The LCD screen includes an array of LCD pixel structures, wherein each LCD pixel structure is associated with a particular pixel of the screen, the LCD pixel structure having a liquid-crystal shutter sandwiched between a rear polarized panel and a front polarized panel and electronics controls configured to operate on the liquid-crystal shutter to modulate light passing through the LCD pixel structure; a matrix of pixel backlights, wherein each pixel backlight is associated with its own individual pixel of the screen and positioned behind the LCD pixel structure associated with its associated individual pixel in a manner to provide transmissively illuminate therethrough, each pixel backlight being independently addressable from the other pixel backlights of the matrix; and a backlight control subsystem configured to modulate intensity of light generated by each pixel backlight of the matrix.

Next in the process, the resulting image is generated on that LCD screen based upon the obtained video signal. The generation includes:

determining whether a particular pixel should be black based upon the obtained video signal;

in response to a determination that the particular pixel should be black, turning off the pixel backlight associated with the particular LCD pixel structure of that black pixel.

Further, the determining action is based (either solely or in part) upon a portion of the obtained video signal that directs modulation of the liquid-crystal shutter of the particular LCD pixel structure of that black pixel.

Transmissive Illumination of Display Using Edge-Mounted Deposited Light-Generating An LCD display edge-lit backlit by conventional LEDs involves mounting multiple LEDs around the periphery of the display in order to light a conventional light plate. With such an arrangement, each LED is a point light source. As such, the light is distributed from a point. Consequently, the light is not uniformly distributed.

One or more of the new approaches described herein uses deposited light-generating sources (e.g., pLEDs) to for transmissive illumination of the lightplate of a LCD display.

Figure 4:
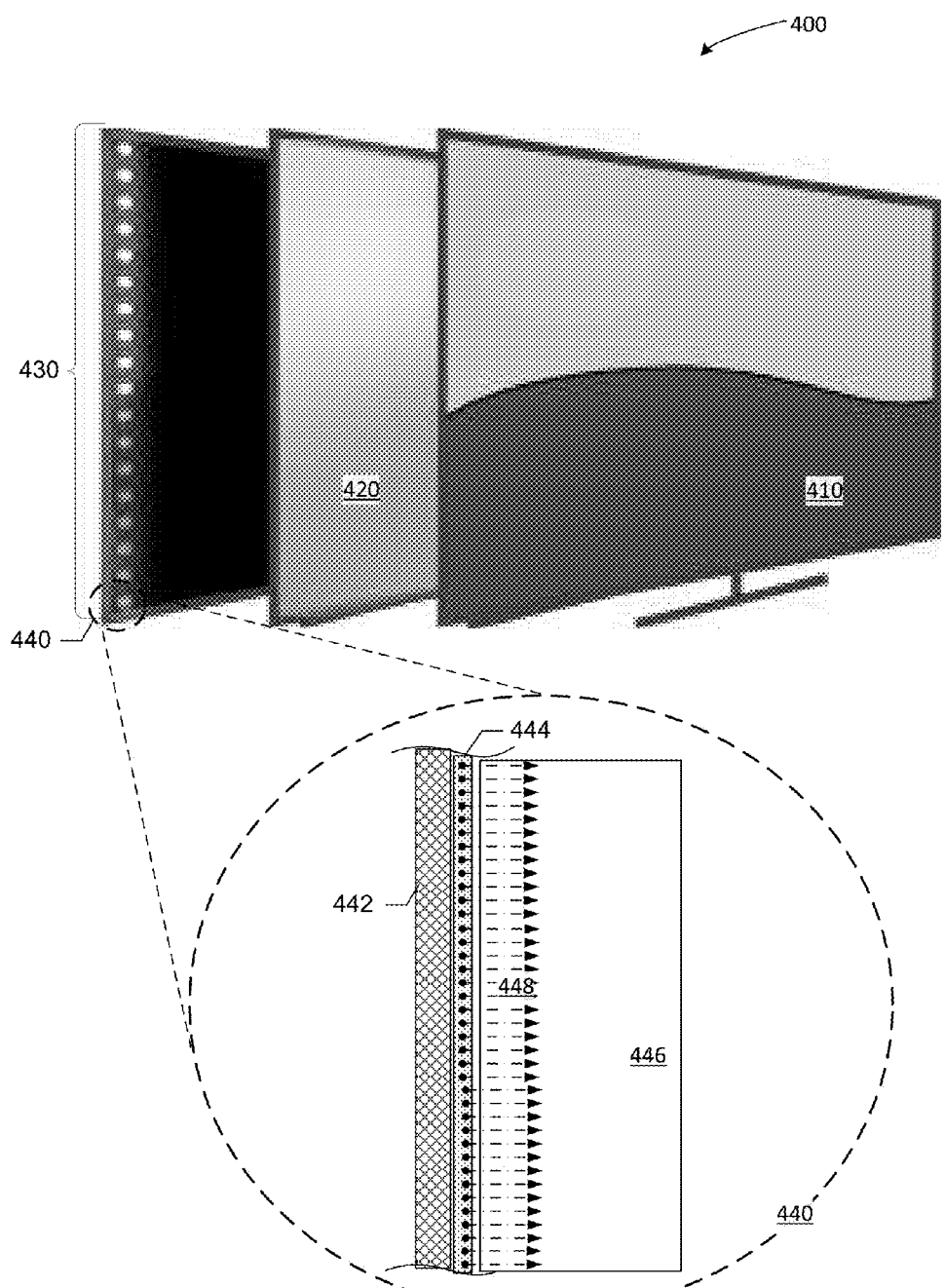
FIG. 4 shows an example system in accordance with one or more implementations described herein.

FIG. 4 shows a LCD monitor 400 (e.g., a television) with the new technology incorporated therein. The monitor 400 includes a typical LCD screen and pixel array 410, a typical light guide plate (LGP) 420, and edge-mounted light strip 430 in accordance with the new technology described herein. The light strip 430 may be mounted on any number of edges (e.g., one, two, three, four, etc.).

Section 440 shows a blow-up of one area of the light strip 430. Depicted in the blow-up region is the following: an edge mount 442, a portion 444 of the light strip itself, and a portion 446 of the typical LGP. The light strip 430 (and the depicted portion 444) is attached to the edge mount 442, which may be just the edge of the interior of the monitor 400.

The light strip 430 is strip of substrate with a cloud or array of LEDs and circuitry printed thereon so as to shine it light into the LGP. The arrows 448 depict the light shining into the LGP.

The implementation may be described in this manner. The LCD screen includes an array of LCD pixel structures, wherein each LCD pixel structure is associated with a particular pixel of the screen, the LCD pixel structure having a liquid-crystal shutter sandwiched between a rear polarized panel and a front polarized panel and electronics controls configured to operate on the liquid-crystal shutter to modulate light passing through the LCD pixel structure.

The LCD screen includes a light guide plate (LGP) positioned behind the array of LCD pixel structures and configured to provide light for transmissive illumination therethrough, the LGP being configured to optically transmit light from its edges so as to emanate from its surface.

The LCD screen includes an edge-mounted light strip mounted to at least one edge of the LCD system and positioned to direct its light into an edge of the LGP, the light strip having a plurality of light-generating sources thereon in a manner without noticeable edge-linear gaps without a light-generating source.

Herein, edge linear refers to a line along the edge of the screen and/or LGP. That is, unlike a traditional LED edge-light LGP there are no perceptible gaps in lighting between each LED.

Deposited Light-Generating Sources

Conventionally, the smallest produced surface-mount LEDs are about 1.0 mm long by 0.8 mm wide and 0.2 mm thick. An example of a light-generating component (which may be part of 110, 210, 310 for example) that is contemplated to be used with the technology described herein is described in U.S. Pat. No. 8,415,879, which is titled "Diode for a Printable Composition." These semi-conductor light-generating sources are called "printable light-emitting diodes" or more generally "placeable" LEDs. That maybe generally called pLEDs herein.

Each pLED has a cross-section with a maximum length of 3 to 50 microns. Indeed, in some implementations, the light-generating component has a cross-section with a maximum length of 15 to 20 microns. This is about thirty to fifty times smaller than the smallest conventional surface-mount LEDs available.

Using the pLEDs, each group of light-generating sources contains about two-thousand sources in some implementations. In other implementations, a group may contain as much as five-thousand sources.

Of course, other implementations may use different technology for the light-generating sources that may be deposited on a thin layer of material (e.g., 0.07 to 0.25 mm thick) and in an electrically conductive manner.

Of course, other suitable light-generating sources may be used with implementations discussed herein and otherwise contemplated. In some implementations, a suitable light-generating source is smaller than 1.0 mm long by 0.8 mm wide and 0.2 mm thick and is larger than includes light-emitting semiconductors that each has a cross-section with a maximum length of 3 to 50 microns.

Deposition of Light-Generating Sources

Implementations of the technology described herein that use the pLEDs involve a disposition (e.g., printing, spraying, etc.) of printable light-emitting diodes that are suspended in a liquid or gel (e.g., ink).

The process of placing the light-generating sources 312 that are suspended in a liquid or gel on the lightplate is called "liquid deposition" herein. The liquid deposition may be accomplished by printing, spraying, or other such application processes. Indeed, the liquid deposition may be accomplished on a conventional printing press, screen press, ink jet printing, or other printing technology.

Deposition, as used herein, of light-generating sources involves the placement of such sources on a surface and in such a manner so that it is or can be linked electronically to a power source. Disposition does not include surface mounting as is accomplished with conventional LEDs. Rather, deposition herein includes, for example, liquid deposition, printing, spraying, lithography, electrophotography, ejection, squirting, shooting, electrophoresis, electroplating, and the like onto a surface.

Of course, other implementations may use different technology for the light-generating sources that may be deposited on a thin layer of material (e.g., 0.07 to 0.25 mm thick), such as a thin film, underneath the keys and in an electrically conductive manner.

With the existing printed LED technology, the pLEDs are suspended in a liquid or gel (e.g., ink). That pLED ink is printed on a surface. Indeed, this printed may be accomplished on a conventional printing press or screen press.

An example of an existing pLED printing process includes:
- printing a trace of conductive material (e.g., silver ink or clear ink with conductive nano-fibers) on non-conductive substrate (e.g., polyester);
- using ink with pLEDs dispersed therein, printing shapes/areas/regions of pLEDs over the traces;
- printing another trace of conductive material (e.g., silver ink or clear ink with conductive nano-fibers) over the shapes/areas/regions of pLEDs thus completing a circuit (once attached to a power source) therethrough the pLEDs.

Placement of Light-Generating Sources

Alternative implementations of the technology described herein may employ precisely placed unpackaged LEDs. For example, very tiny unpackaged LEDs may be placed onto a substrate with a printed circuitry via a mechanical apparatus using one or more various techniques to pick-and-place the LEDs (e.g., magnetics, electrostatic, van der Waals force, etc.).

Additional and Alternative Implementation Notes

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventor intends the described exemplary implementations to be primarily examples. The inventor does not intend these exemplary implementations to limit the scope of the appended claims. Rather, the inventor has contemplated that the claimed invention might also be embodied and implemented in other ways, in conjunction with other present or future technologies.

Moreover, the word "exemplary" is used herein to mean serving as an example, instance, or illustration. Any aspect or design described herein as exemplary is not necessarily to be construed as preferred or advantageous over other aspects or designs. Rather, use of the word "exemplary" is intended to present concepts and techniques in a concrete fashion. The term "technology," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the execution of the instructions on the medium may cause performance of the operations described herein. For example, or more computer-readable media with processor-executable instructions stored thereon which when executed by one or more processors may cause performance of operations described herein.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "computer-readable media" is computer-storage media. For example, computer-storage media may include, but are not limited to, magnetic storage devices (e.g., hard disk, floppy disk, and magnetic strips), optical disks (e.g., compact disk [CD] and digital versatile disk [DVD]), smart cards, flash memory devices (e.g., thumb drive, stick, key drive, and SD cards), and volatile and nonvolatile memory (e.g., RAM and ROM).

What is claimed is:

1. A liquid crystal display (LCD) system comprising:
   an array of LCD pixel structures, each LCD pixel structure having:
      a liquid-crystal shutter sandwiched between a rear polarized panel and a front polarized panel, and
      electronics controls configured to operate on the liquid-crystal shutter to modulate light passing through the respective LCD pixel structure;
   a matrix of pixel backlights placed directly on the rear polarized panel disposed behind the array of LCD pixel structures, each pixel backlight being associated with an LCD pixel structure, each pixel backlight being independently addressable from other pixel backlights of the matrix, each pixel backlight including at least one unpackaged light-emitting diode (LED); and
   a backlight control subsystem configured to modulate intensity of light generated by each pixel backlight of the matrix.

2. The LCD system according to claim 1, wherein each LCD pixel structure includes three or more different colored subpixel structures.

3. The LCD system according to claim 1, wherein the backlight control subsystem is further configured to turn off light generated by a pixel backlight associated with a black LCD pixel structure.

4. The LCD system according to claim 1, wherein the backlight control subsystem is further configured to turn off light generated by a pixel backlight associated with a shuttered LCD pixel structure.

5. The LCD system according to claim 1, wherein the backlight control subsystem is further configured to turn off light generated by a pixel backlight associated with an LCD pixel structure with a liquid-crystal shutter that is closed down.

6. The LCD system according to claim 1, wherein the backlight control subsystem is further configured to turn off light generated by a particular pixel backlight while generating light by other pixel backlights that are physically adjacent thereto.

7. The LCD system according to claim 1, wherein each pixel backlight includes a plurality of unpackaged LEDs.

8. The LCD system according to claim 1, wherein each pixel backlight includes a plurality of unpackaged LEDs, a cross-section of each of the unpackaged LEDs having a maximum dimension of 3 to 50 microns.

9. The LCD system according to claim 1, wherein a cross-section of the at least one unpackaged LED has a maximum dimension of 3 to 50 microns, and
wherein the at least one unpackaged LED is precisely placed on the rear polarized panel.

10. A method facilitating local dimming, the method comprising:
obtaining a video signal to generate an image on a liquid-crystal display (LCD) screen, the LCD screen including:
an array of LCD pixel structures, each LCD pixel structure having:
a liquid-crystal shutter sandwiched between a rear polarized panel and a front polarized panel, and
electronics controls configured to operate on the liquid-crystal shutter to modulate light passing through the respective LCD pixel structure,
a matrix of pixel backlights disposed directly on the rear polarized panel, each pixel backlight being associated with an LCD pixel structure, each pixel backlight being independently addressable from other pixel backlights of the matrix, and each pixel backlight including at least one unpackaged light-emitting diode (LED), and
a backlight control subsystem configured to modulate intensity of light generated by each pixel backlight of the matrix; and
generating the image on the LCD screen based upon the video signal, the generating including:
determining whether a particular pixel should be black based upon the video signal, and
turning off, in response to a determination that the particular pixel should be black, a pixel backlight that is associated with the particular pixel.

11. The method according to claim 10, wherein the determining is based, at least in part, upon a portion of the video signal that directs modulation of the liquid-crystal shutter of a corresponding LCD pixel structure of the particular pixel.

12. The method according to claim 10, wherein the determining is based solely upon a portion of the video signal that directs modulation of the liquid-crystal shutter of a corresponding LCD pixel structure of the particular pixel.

13. The method according to claim 10, further comprising precisely placing the at least one unpackaged LED on the rear polarized panel,
wherein a cross-section of the at least one unpackaged LED has a maximum dimension of 3 to 50 microns.

14. A liquid crystal display (LCD) system comprising:
an array of LCD pixel structures, each LCD pixel structure associated with a pixel of the system, and each LCD pixel structure having:
a liquid-crystal shutter sandwiched between a rear polarized panel and a front polarized panel, and
electronics controls configured to operate on the liquid-crystal shutter to modulate light passing through the respective LCD pixel structure; and
a matrix of pixel backlights disposed directly on the rear polarized panel to provide illumination for the array of LCD pixel structures, each pixel backlight including at least one unpackaged light-emitting diode (LED).

15. The LCD system according to claim 14, wherein each pixel backlight is independently addressable from other pixel backlights of the matrix.

16. The LCD system according to claim 14, further comprising a backlight control subsystem configured to modulate intensity of light generated by each pixel backlight of the matrix.

17. The LCD system according to claim 16, wherein the backlight control subsystem is further configured to turn off light generated by a particular pixel backlight while generating light by other pixel backlights that are physically adjacent thereto.

18. The LCD system according to claim 14, wherein dimensions of the at least one unpackaged LED are not greater than 1.0 mm long by 0.8 mm wide and 0.2 mm thick.

* * * * *